United States Patent [19]

Maier, Jr.

[11] 4,284,964

[45] Aug. 18, 1981

[54] SELF-DETERMINATION OF LASER FREQUENCY

[75] Inventor: Roe J. Maier, Jr., Bosque Farms, N. Mex.

[73] Assignee: The United States of America as represented by the Secretary of the Air Force, Washington, D.C.

[21] Appl. No.: 36,252

[22] Filed: May 4, 1979

[51] Int. Cl.³ .............................................. H01S 3/10
[52] U.S. Cl. ............................................... 331/94.5 S
[58] Field of Search ..................... 331/94.5 C, 94.5 D, 331/94.5 S; 356/346

[56] References Cited

U.S. PATENT DOCUMENTS

| 3,879,130 | 4/1975 | Greenstein | 356/350 |
| 4,165,183 | 8/1979 | Hall et al. | 356/346 |

Primary Examiner—William L. Sikes
Assistant Examiner—León Scott, Jr.
Attorney, Agent, or Firm—Donald J. Singer; Thomas L. Kundert

[57] ABSTRACT

An apparatus utilizing a resonant laser cavity to create two modes of oscillation and lock the operation of the cavity onto the mode pair. The cavity pathlength is adjusted using a feedback loop which detects the beat frequency of the pair of modes and tracks a feedback signal which is functionally proportional to the product of the square root of the mode intensities. In one variation beat frequency pulses are accumulated for a period determined by a time reference which is more accurate than the frequency gap between adjacent pairs of modes, but is less accurate than the precision to which the individual modes are known once the specific pair is designated. The exact frequency of each mode is known a priori from its wavelength to the sharpness of the atomic line. In tnis manner, a time reference of nominal accuracy may be used to designate the pair of modes present in the laser cavity, and in doing so, simultaneously designates their frequency to a high degree of accuracy. If laser operation is interrupted after calibration, the apparatus can ascertain the new mode frequencies and compute a compensating correction factor.

2 Claims, 4 Drawing Figures

SELF-DETERMINATION OF LASER FREQUENCY

RIGHTS OF THE GOVERNMENT

The invention described herein may be manufactured and used by or for the Government of the United States for all governmental purposes without the payment of any royalty.

BRIEF SUMMARY OF THE INVENTION

The present invention is directed to an apparatus for maintaining a pair of oscillating modes in a laser resonating cavity by sensing the beat frequency, and for ascertaining the exact frequency of oscillation after the laser cavity has lost calibration. A low frequency feedback loop adjusts the laser pump power to create a pair of oscillating modes in the laser cavity. Once created, the pair of modes is sustained by cavity pathlength adjustments which are responsive to the beat frequency of the modes, these being in the form signals proportional to the product of the square root of the two mode intensities. Cavity pathlength adjustments are made whenever the signals deviate from a reference signal.

Normally if laser operation is interrupted, and environmental effects have altered the laser cavity structure, the laser cavity locks onto a new mode pair upon the resumption of its oscillation. The laser must then be recalibrated if accuracy having atomic line sharpness is to be maintained. One embodiment of the invention overcomes this deficiency by using a relatively coarse time reference to designate the new pair of oscillating modes, which, from a priori data, also designates the oscillating frequencies of the individual modes to atomic line accuracy. By detecting and locking the cavity oscillations onto the beat frequency of mode pairs, the frequency spread between adjacent mode pairs is made relatively large. It is this broad spread, coupled with the accurate prior knowledge of the mode pair frequencies, that permits accuracy improvements in the range of two orders of magnitude over the time reference used to perform the recalibration.

DETAILED DESCRIPTION

Figure 1:
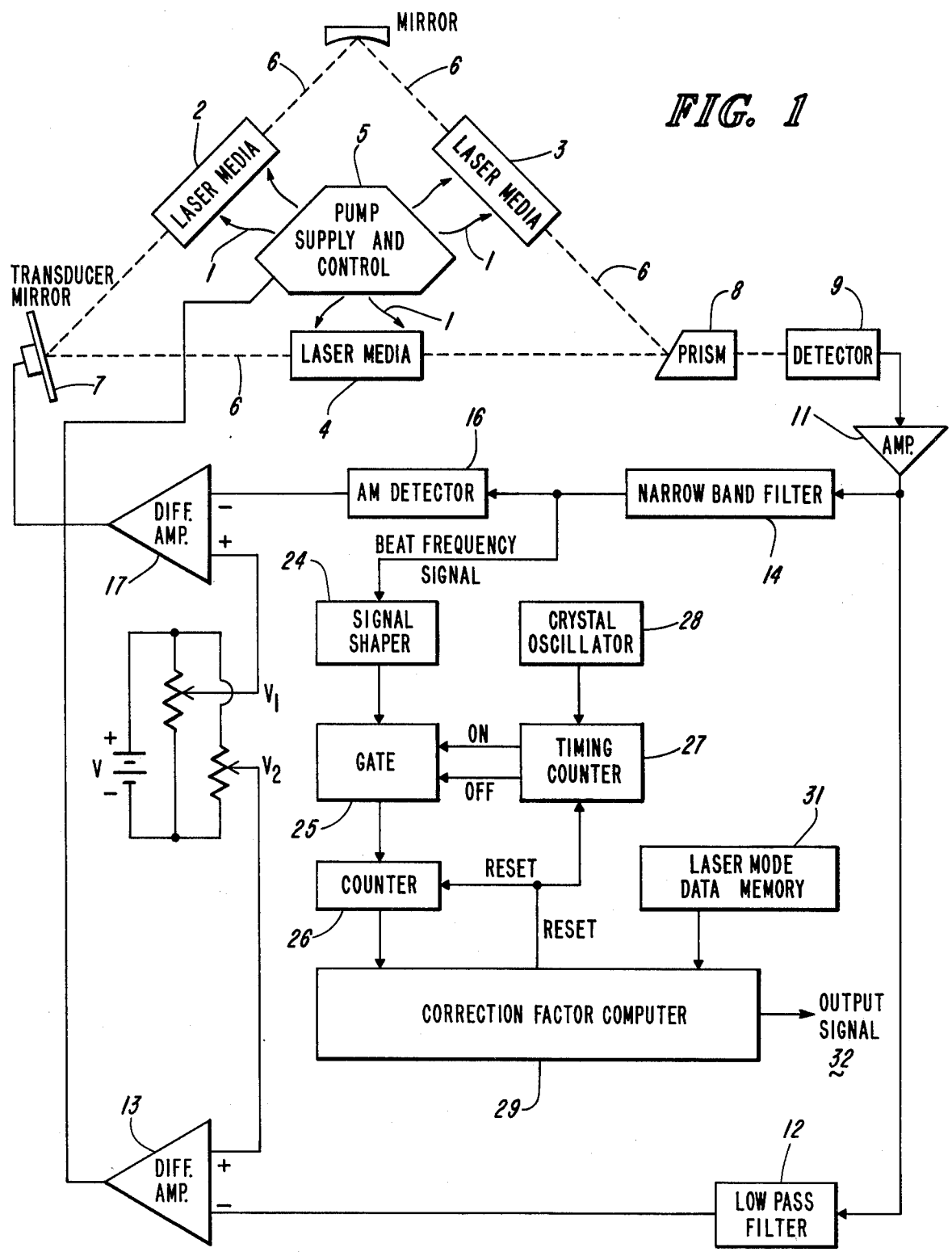
FIG. 1 is a schematic block diagram of a ring laser and embodying apparatus.

Directing attention to FIG. 1, there appears a conventional ring laser of the rate sensing type having attached thereto the electronic apparatus embodying this invention. Oscillating means of luminous energy are created and sustained in transmit about the laser by introducing luminous energy 1 into active laser media cavities (2, 3 and 4) with pump 5. The oscillating beams travel around the ring laser along path 6 so long as the energy added by pump 5 exceeds the losses of the beams. As is well known, and appears in FIG. 1, the pathlength of path 6 is adjustable by transducer mirror 7 to select the modes of oscillation and compensate for environmentally induced changes in the size of the ring laser.

The rate sensing species of ring laser in FIG. 1 is generally configured to have two beams of luminous energy traveling in opposite directions along the same path. In a conventional ring laser the two beams converge in prism 8, producing no detectable response so long as the ring laser does not rotate. If the ring laser rotates, the Doppler effect on the oppositely traveling beams creates interference fringes in prism 8, which are then sensed by special detector 9. Each fringe represents a small segment of angle and their count rate is proportional to the ring laser gyro's rotation rate.

Attention is now directed to two prior art references which for purposes of background are particularly apropos. The first is U.S. Pat. No. 3,395,365 to R. L. Fork, relating to the use of two modes of oscillation. The second is U.S. Pat. No. 3,411,849 to F. Aronowitz, applying the multiple mode concept to ring lasers. Together, they are useful introductions to the concepts disclosed hereinafter.

Figure 2:
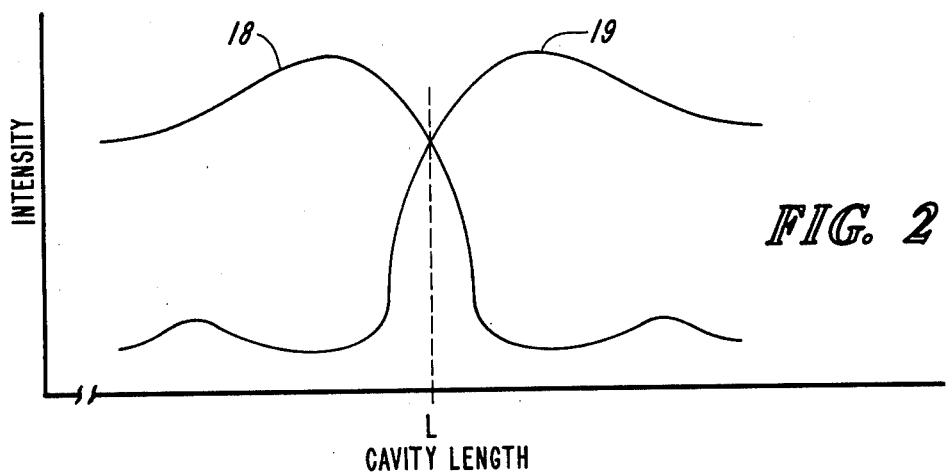
FIG. 2 has a pair of plots showing the individual intensities of a pair of modes in relation to the length of the laser cavity.
Figure 3:
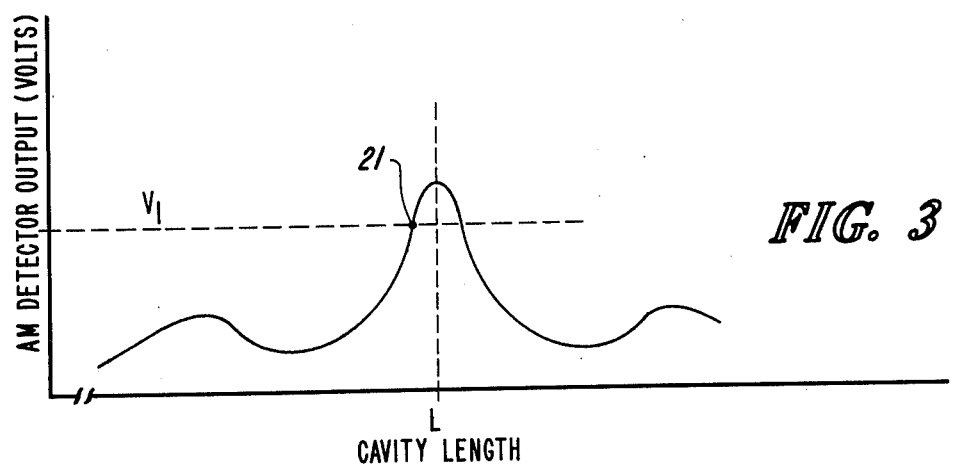
FIG. 3 is a curve showing the relationship between the AM detector output signal and the laser cavity length.
Figure 4:
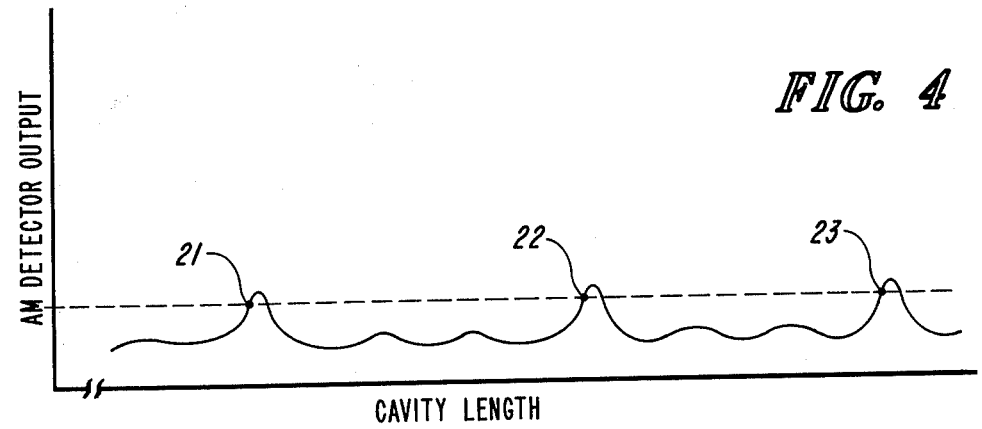
FIG. 4 is another curve showing AM detector output, expanded to show the multiplicity of mode pair responses and corresponding apparatus operating points.

FIGS. 2, 3 and 4 contain plots of signal characteristics from various locations in the schematic of FIG. 1. These plots are intended to be qualitative in their representation, and as such merely aid in unifying the description of the various functions being performed in FIG. 1.

Turning now to the structural elements comprising the electronics attached to the ring laser, note the presence of two feedback loops. The signals received by fringe counting detector 9 are first amplified in amp 11 and then applied equally to the outer feedback loop, which controls pump 5, and the inner loop, which regulates cavity pathlength adjusting transducer mirror 7.

The electrical signal traveling the outer feedback loop is first altered by low pass filter 12 and then applied as the negative input to differential amplifier 13. Thereby, additional pump power from laser pump 5 is introduced into the laser cavity whenever the signal from low pass filter 12 falls below reference voltage $V_2$. The value of voltage $V_2$ is adjusted in coordination with the inner loop to create and sustain two modes of laser cavity oscillation.

The inner feedback loop of the apparatus adjusts the cavity pathlength in concert with the outer feedback loop to lock onto and sustain the two oscillating modes. The signal from amp 11 enters narrow band filter 14 of the inner loop, from which eminates a beat frequency signal corresponding to the beating effect of the two modes sensed by detector 9. The signal from filter 14 is next demodulated by AM detector 6 and compared to reference voltage $V_1$ in differential amplifier 17. Voltage $V_1$ is adjustable, and for purposes of this embodiment is set to a magnitude at which the output of differential amplifier 17 drives transducer mirror 7 to a pathlength setting at which two oscillating modes can coexist in the laser cavity.

The manner in which two oscillating modes are created and sustained is best described with reference to the illustrations in accompanying FIGS. 2, 3 and 4. For purposes of the ensuing description the pair of modes shall be those of one direction about path 6 of the laser cavity. The effects of the opposite direction will be described at a later point. FIG. 2 contains two plots, 18 and 19, which depict the relationship between the intensities of two modes and laser cavity length. Note that at an effective cavity length L, assuming pump input power is adequate to overcome losses, both modes may be sustained in the laser cavity in substantially equal amounts. Combining such mode pairs, of which there are numerous sets, in prism 8 generates an output signal in fringe counting detector 9 whose sum total is proportional to the multiple of the square root of the two signal intensities. The frequency of interest from detector 9 is the beat frequency of the individual modes. Narrow band filter 14 excludes from the inner feedback loop all but a limited group of potential beat frequencies, which group is to a degree defined by the limits of the laser cavity pathlength adjusting apparatus. Thereby, the signal entering AM detector 16 has an envelope substantially of the form plotted in FIG. 3, modulated at the distinct beat frequency for the two oscillating modes in the laser cavity.

Closing of the inner feedback loop locks the operation of the laser to one particular pair of modes. This is accomplished by removing the modulating effects of the beat frequency with AM detector 16, producing at its output side a voltage whose magnitude is functionally related to cavity length with a response as shown in FIG. 3. When the voltage entering differential amplifier 17 is set a $V_1$, the loop closing through transducer mirror 7 locks the loop into operation at point 21.

If laser cavity oscillation is interrupted, or its operation is perturbed sufficiently to cause point 21 to shift to a location right of L, the slope of the output curve creates an unstable operating state. An unstable condition merely drives the cavity length adjustment until the adjacent pair of modes is encountered on the stable feedback of the beat frequency. For example, in FIG. 4 the operating point would move from the signal peak at point 21 to that of 22, or from that of 22 to that of 23. In this way, the apparatus always locks to a precisely defined beat frequency representing a distinct pair of oscillating modes within the laser cavity. The frequencies of the individual pairs are known a priori to a high degree of accuracy, leaving as the unknown the designation of the pair from the group.

The answer to this unknown is addressed by the remaining structure appearing in FIG. 1. The beat frequency passing through narrow band filter 14 is also conveyed through signal shaper 24 to logic gate 25. The gate either passes the signal through to counter 26, if an "on" signal is present, or inhibits passage if an "off" signal exists. The on-off signals are exclusive, with the "on" segment being a period of time determined by an accumulation of oscillator pulses in timing counter 27. During this same period of time the beat frequency pulses are accumulated in counter 26. The magnitude of the frequency count in counter 26 is directly dependent upon the time which elapses in accumulating a specified count in timing counter 27. The accuracy of that elapsed time is then, the accuracy of the beat frequency as reflected by the accumulation in counter 26 is directly determined by the accuracy of crystal oscillator 28.

Correction factor computer 29 compares the frequency represented by the accumulation in counter 26 with data in memory 31. The data in memory 31 is a compilation of a group of beat frequencies corresponding to the potential pairs of modes which could be sustained in the laser cavity. Each peak in FIG. 4 represents a member of that group. With this a priori knowledge from memory 31, the computer selects the nearest or most likely pair of laser cavity modes on the basis of the count accumulated in counter 26. Once the modes are designated, the laser frequency and cavity length parameters are known from the wavelength of the cavity media to the sharpness of its atomic line.

The particularly novel feature of this aspect of the invention is the ability to obtain extremely precise frequency measurements by utilizing a moderate accuracy crystal oscillator and a priori data about the potential pairs of laser cavity oscillating modes.

Consider the following illustrative scenario. The numerical values are relative, but are, nevertheless, within the general range of what might be expected from a ring laser gyro. First, assume the crystal oscillator generates a 5 MHz signal with a known accuracy of 0.1 part per million (ppm). Further consider the laser cavity and inner loop feedback apparatus to have locked onto a pair of modes having a beat frequency of 750 MHz, with the next adjacent beat frequencies spaced above and below at frequency increments of 1100 Hz. Since the wavelength of the oscillating beam in the laser cavity is known to the precision of its atomic line, the frequencies of the two modes, and their beat frequency, are known to within $\pm 1$ Hz. Now if timing counter 27 permits passage of beat frequency signals through gate 25 until counter 27 accumulates a count of 500K, counter 26 will have accumulated a nominal count of $75 \times 10^6$ over the same time period. From the known accuracy of the crystal oscillator 28 it can be concluded that actual count for the beat frequency signal falls within the range of $75 \times 10^6 \pm 7.5$ counts. The exact operating modes of the laser cavity, on the other hand, are not only accurately known but are also known to be located at incremental beat frequency steps of 110 counts for a comparable time segment. Thereby, the count accuracy of the crystal oscillator is sufficiently precise to distinguish between adjacent steps of beat frequency so that the exact pair of laser cavity oscillating modes can be designated.

Once the pair of modes has been designated the oscillating frequencies within the laser cavity are known to within $\pm 1$ Hz. In this manner, the frequency accuracy of the laser cavity is known to a degree nearly two orders of magnitude greater than the accuracy of the standard used to perform the determination.

In one form of the embodiment, correction factor computer 29 adjusts output signal 32, representing frequency, to compensate for variations in the laser cavity operating modes. This function is particularly useful when it is not feasible to repeatedly recalibrate a laser cavity, yet interruptions in the cavity oscillations are anticipated. Though the ring laser and associated apparatus disclosed in FIG. 1 may lock onto a different pair of modes upon the resumption of operation, correction factor computer 29 can calculate the necessary correction and alter output signal 32 to be substantially unaffected by the change in modes of oscillation.

Those skilled in the art will recognize that the ring laser gyro shown in FIG. 1, when operated in the manner taught, will produce a pair of oscillating modes in each of the two directions about path 6. There are various techniques for separating the frequency determination function described herein from the conventional rate sensing function of the gyro. As one example, one frequency determination apparatus can be structurally separated so as to detect only the pair of modes traveling in one direction. In another approach, the individually detected signals generated internal to interference fringe detector 9 can be summed and threshold voltage $V_1$ adjusted sufficiently high to ignore the effects of sidebands generated by the summing action. The simplest approach, if the particular application of the ring laser gyro admits, is to perform the frequency determination only when the gyro's rotation rate is zero. These and other techniques are nevertheless beyond the scope of this disclosure, the central feature of which pertains to using beat frequency for pathlength adjustment and frequency determination.

I claim:

1. An apparatus for determining the frequency of a ring laser when potential modes and the beat frequency of mode pairs is accurately known a priori, comprising:
   a. a laser resonant cavity including an active media;
   b. a means for introducing energy into said cavity in a sufficient quantity to pump said active media so as to sustain a pair of resonant modes distinguished by frequency, each having beams traveling in opposite directions;
   c. a means for detecting the beat frequency of said modes and generating a signal whose amplitude is proportional to a multiple of the mode intensities;
   d. a means for adjusting the pathlength of said laser cavity which is responsive to said signal;
   e. a means for counting beat frequency signals;
   f. a means for timing the count of said beat frequency signals, where the accuracy of said timing means is sufficiently precise to define the pair of modes on the basis of difference frequencies known a priori; and
   g. a means for comparing the count with the beat frequencies of known pairs of modes to select the most likely pair of modes actually present in the cavity.

2. The apparatus as recited in claim 1, wherein the means for detecting the beat frequency of said modes comprises an interference fringe counting detector, a bandpass filter and a demodulator, and further where the means for adjusting the pathlength comprises a pathlength adjuster which is responsive to the difference between the signal leaving the demodulator and a reference signal.

* * * * *

UNITED STATES PATENT AND TRADEMARK OFFICE
CERTIFICATE OF CORRECTION

PATENT NO. : 4,284,964

DATED : August 18, 1981

INVENTOR(S) : Roe J. Maier

It is certified that error appears in the above-identified patent and that said Letters Patent are hereby corrected as shown below:

Col 1, line 61, change "means" to --- beams ---.

Col 1, line 62, change "transmit" to --- transit ---.

Col 2, line 53, change "6" to --- 16 ---.

Col 3, line 56, after "time is", insert --- directly related to the accuracy of crystal oscillator 28. In conclusion ---.

Signed and Sealed this

Second Day of February 1982

[SEAL]

Attest:

Attesting Officer

GERALD J. MOSSINGHOFF

Commissioner of Patents and Trademarks